(12) United States Patent
Kavounas

(10) Patent No.: US 7,751,852 B2
(45) Date of Patent: Jul. 6, 2010

(54) NOTIFYING STATIONS FOR PORTABLE ELECTRONIC DEVICES AND METHODS

(76) Inventor: Gregory T. Kavounas, 11410 NE. 124th St., PMB 216, Kirkland, WA (US) 98034

( * ) Notice: Subject to any disclaimer, the term of this patent is extended or adjusted under 35 U.S.C. 154(b) by 791 days.

(21) Appl. No.: 11/682,675

(22) Filed: Mar. 6, 2007

(65) Prior Publication Data

US 2008/0220823 A1 Sep. 11, 2008

(51) Int. Cl.
*H04M 1/00* (2006.01)
(52) U.S. Cl. .................. 455/556.1; 455/557; 455/575.1
(58) Field of Classification Search ........................ None
See application file for complete search history.

(56) References Cited

U.S. PATENT DOCUMENTS

| | | | |
|---|---|---|---|
| 4,859,100 A | 8/1989 | Carlson et al. | |
| 4,969,180 A | 11/1990 | Watterson et al. | |
| 5,758,289 A | 5/1998 | Lipp et al. | |
| 5,764,751 A | 6/1998 | Konishi | |
| 5,987,311 A | 11/1999 | Phillips | |
| 5,995,844 A | 11/1999 | Fukuda | |
| 6,073,031 A | 6/2000 | Helstab et al. | |
| 6,240,297 B1 * | 5/2001 | Jadoul | 455/466 |
| 6,266,539 B1 | 7/2001 | Pardo | |
| 6,271,764 B1 | 8/2001 | Okamura | |
| 6,560,468 B1 | 5/2003 | Boesen | |
| 6,567,672 B1 | 5/2003 | Park et al. | |
| 6,630,927 B2 | 10/2003 | Sherman et al. | |
| 6,704,580 B1 * | 3/2004 | Fintel | 455/550.1 |
| 6,731,312 B2 | 5/2004 | Robbin | |
| 6,836,643 B2 | 12/2004 | Shealtiel | |
| 6,928,300 B1 | 8/2005 | Skinner et al. | |
| 6,947,771 B2 | 9/2005 | Guo et al. | |
| 6,978,154 B1 | 12/2005 | Ospalak et al. | |
| 7,102,535 B2 | 9/2006 | Otsuki et al. | |
| 7,110,789 B1 | 9/2006 | Curtiss et al. | |
| 7,493,146 B1 * | 2/2009 | Delker et al. | 455/567 |
| 2002/0107009 A1 | 8/2002 | Kraft et al. | |
| 2003/0013495 A1 | 1/2003 | Oleksy | |
| 2003/0054866 A1 | 3/2003 | Byers et al. | |

(Continued)

OTHER PUBLICATIONS 1-page article probably by Darrin Olson, found in website of company named Wildcharge at www.wildcharge.com, downloaded by applicant on Sep. 17, 2007.

(Continued)

*Primary Examiner*—Erika A Gary

(57) ABSTRACT

Generally, the present invention provides stations for one or more portable electronic devices (PEDs) and methods for such stations. A station can support a PED, and sense when the PED would be notifying its user about a wireless signal that is received from a remote transmitter. When the station so senses, it further generates a human-perceptible indication to help notify the user, who might have walked away. The human-perceptible indication can include, a call sound, a light signal, etc. This way, for example, when the PED is only vibrating, the call sound can be such that the station rings like a regular home telephone, and/or the light signal can be such that the station lights up without distracting coworkers as much. As such, the user can always keep the PED at the "Silent" annunciation mode.

11 Claims, 12 Drawing Sheets

U.S. PATENT DOCUMENTS

| | | |
|---|---|---|
| 2004/0204152 A1 | 10/2004 | Chang et al. |
| 2005/0052156 A1 | 3/2005 | Liebenow |
| 2006/0063563 A1 | 3/2006 | Kaufman |
| 2006/0116175 A1 | 6/2006 | Chu |
| 2007/0037605 A1 | 2/2007 | Logan |
| 2007/0127644 A1 | 6/2007 | Tischer et al. |
| 2007/0142083 A1 | 6/2007 | Cupps et al. |

OTHER PUBLICATIONS

Applicant Declaration regarding Article submitted in IDS.

International Search Report and the Written Opinion of the International Searching Authority for PCT application No. PCT/US08/51357, mailing date Apr. 9, 2008. This PCT application corresponds to the subject U.S. application, nine sheets total.

* cited by examiner

CARRIED MOBILE TELEPHONE
- STANDBY

CARRIED MOBILE TELEPHONE
- RINGING

BODY SUPPORTED ON HORIZONTAL SURFACE

BODY ATTACHED TO WALL

BODY INCLUDES CAVITY

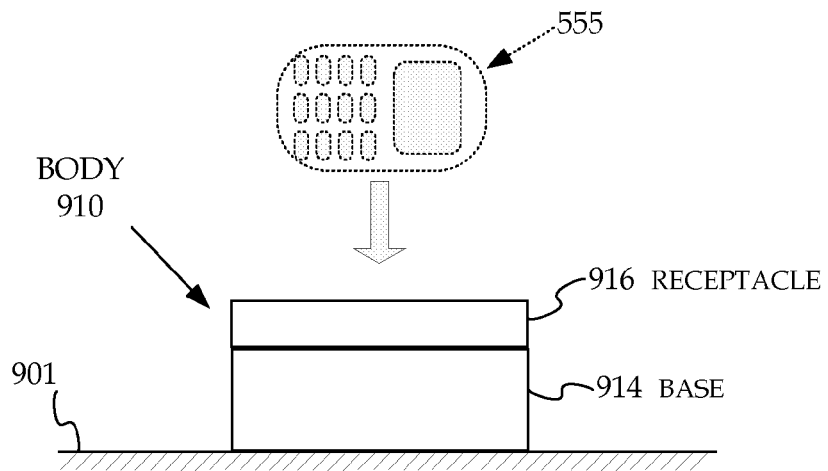
FIG. 9  *RECEPTACLE ON TOP SIDE OF BASE*
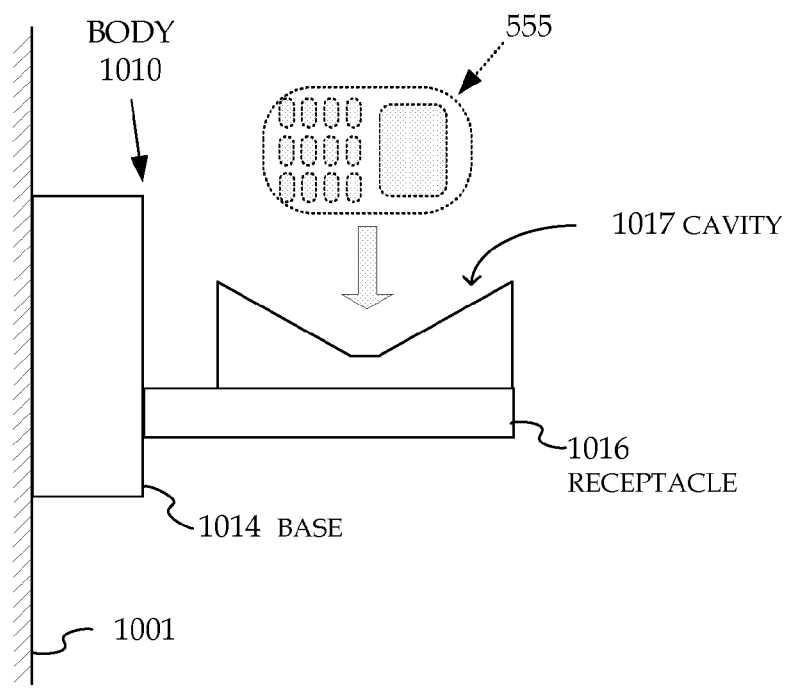
FIG. 10  *RECEPTACLE AT THE SIDE OF BASE*

NOTIFYING STATION FOR
PERSONAL ELECTRONIC DEVICE

SUPPORTED MOBILE TELEPHONE – VIBRATING
NOTIFIER IS SPEAKER,
AND STATION IS ALSO RINGING

*SUPPORTED MOBILE TELEPHONE – RINGING NOTIFIER IS SPEAKER, AND STATION IS ALSO RINGING*

SUPPORTED MOBILE TELEPHONE – VIBRATING
NOTIFIER IS LIGHT,
AND STATION IS ALSO LIGHTING UP

NOTIFYING STATIONS FOR PORTABLE ELECTRONIC DEVICES AND METHODS

BACKGROUND OF THE INVENTION

1. Field of the Invention

The present invention is related to the field of Portable Electronic Devices (PEDs) such as cellphones and PDAs, and more specifically to devices and methods for supporting a PED and notifying a user that may not longer be carrying the PED.

2. Description of the Related Art

Portable Electronic Devices (PEDs) such as cell phones, personal digital assistants (PDAs), and the like are proliferating. A number of them can perform wireless communication, such as permit the user to conduct a telephone conversation, exchange emails or text messages, and so on. Such activities are often via an interface of the device, which can conduct a dialogue with the user, and so on.

In a number of instances, these activities start with an event, such as a PED receiving a telephone call, or receiving an email or text message. For these instances, PEDs notify the users of the event, such as by producing a sound or a vibration, depending on the annunciation mode that the user has chosen. Examples are now described.

FIG. 1 is a diagram of a mobile telephone 100, as it might be carried on a belt 110 of a user (not shown). Mobile telephone 100 is on standby, meaning that it is on, but the user is not using it to conduct a wireless telephone call. Mobile telephone 100 can be set in any annunciation mode 136, which can be either to ring ("Normal"), or to vibrate ("Silent"), if it is to notify its user that it received a wireless signal.

FIG. 2 is a diagram of mobile telephone 100, while receiving a telephone call via a wireless signal 240. For purposes of FIG. 2, mobile telephone 100 has been placed by the user in a "Normal" annunciation mode 236, and therefore rings 250 to notify the user. Ringing 250 can be by generating a ring tone.

This ringing 250 has been undesirable in some settings, where people must keep quiet. And this is not just situations with theaters, but even the workplace. For example, ring tones alone can distract coworkers. Accordingly, the "Silent" annunciation mode has been implemented, as described below.

FIG. 3 is a diagram of mobile telephone 100, while receiving a telephone call via a wireless signal 340. For purposes of FIG. 3, mobile telephone 100 has been placed by the user in a "Silent" annunciation mode 336, and therefore it vibrates 350 to notify the user, instead of ringing.

PEDs permit the user to change the annunciation mode, from "Normal" 236 to "Silent" 336 and back. So, nominally, they can change it to "Silent" 336 every time they enter a place where they have to keep quiet, and back to "Normal" 236 every time they exit such a place.

A problem arises from the fact that it is the user who is required to keep transitioning the PED between the different annunciation modes. Sometimes they forget, resulting in embarrassment if their phone rings when it should not. Others give up, especially when they realize that they can still perceive the vibration, and do not need the ringing of the "Normal" annunciation mode 236. So, they just leave the phone in the "Silent" annunciation mode 336. When they go home, they turn it off, and instead rely on the land line of the home telephone for their telephone conversations.

In some instances, however, they forget to turn off the mobile telephone. As seen in FIG. 4, mobile telephone 100 has been left on a surface 401, such as a table or a desk. Upon receiving a signal 440, mobile telephone 100 vibrates 350 to notify the user. But the user could have walked to another room, and will miss the call because they will not feel the vibration or hear a ringing.

BRIEF SUMMARY

The present invention overcomes these problems and limitations of the prior art.

Generally, the present invention provides stations for one or more portable electronic devices (PEDs), and methods for such stations. In some embodiments, a station supports a PED, and senses when the PED would be notifying its user about a wireless signal that is received from a remote transmitter. When the station so senses, it further generates a human-perceptible indication to help notify the user, who might have walked away. The human-perceptible indication can include, for example, a call sound, a light signal, etc.

In some embodiments, the call sound can be such that the station can ring like a regular home telephone when the PED is only vibrating. The user can thus keep the PED at the "Silent" annunciation mode, without having to remember to change the mode every time they leave the PED on the station, and every time they take it back. Therefore, it would be less necessary for a user to have a separate telephone line for the home, at least for voice communications. And since they can take the mobile telephone with them when they leave, they need have only one telephone number.

In some embodiments, the light signal can be such that the station lights up when the PED is only vibrating. This way, coworkers will be distracted less.

Stations according to optional embodiments can be also stations for charging a battery of the PED. Charging can be via wires of wireless.

The invention will become more readily apparent from the following Detailed Description, which proceeds with reference to the drawings, in which:

BRIEF DESCRIPTION OF THE DRAWINGS

FIG. 9 is a diagram of a station according to embodiments where the body has a base and a receptacle for supporting a PED.

FIG. 10 is a diagram of a station according to embodiments where the body has a base and a receptacle for supporting a PED.

DETAILED DESCRIPTION

As has been mentioned, the present invention provides stations for one or more portable electronic devices (PEDs), and methods for such stations. The invention is now described in more detail.

Figure 1:
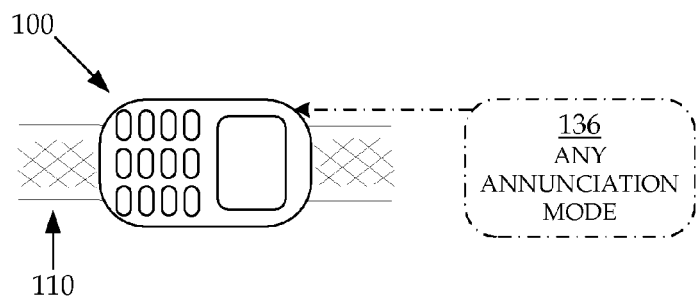
FIG. 1 is a diagram of a mobile telephone, as it might be carried by a user.
Figure 2:
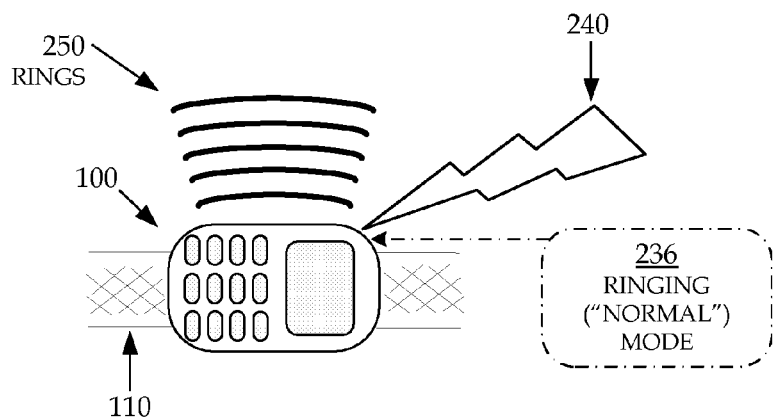
FIG. 2 is a diagram of the mobile telephone of FIG. 1 in a "Normal" annunciation mode, while receiving a telephone call, and ringing to notify the user.
Figure 3:
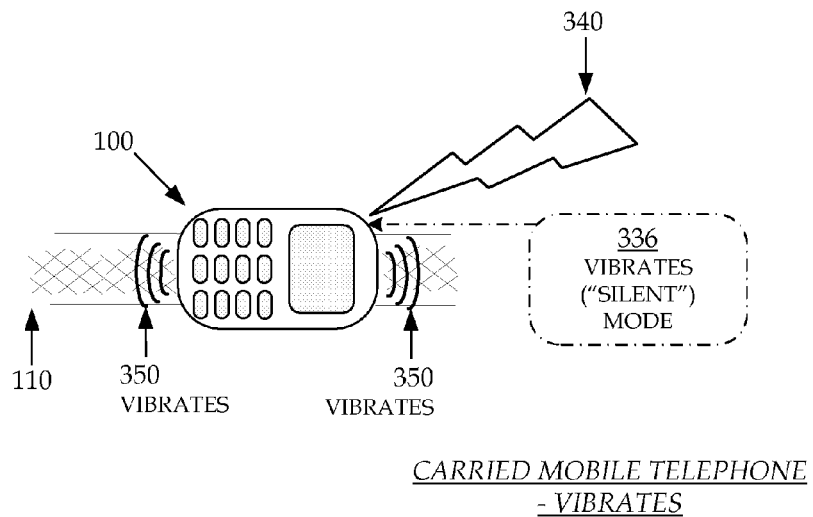
FIG. 3 is a diagram of the mobile telephone of FIG. 1 in a "Silent" annunciation mode, while receiving a telephone call and vibrating to notify the user.
Figure 4:
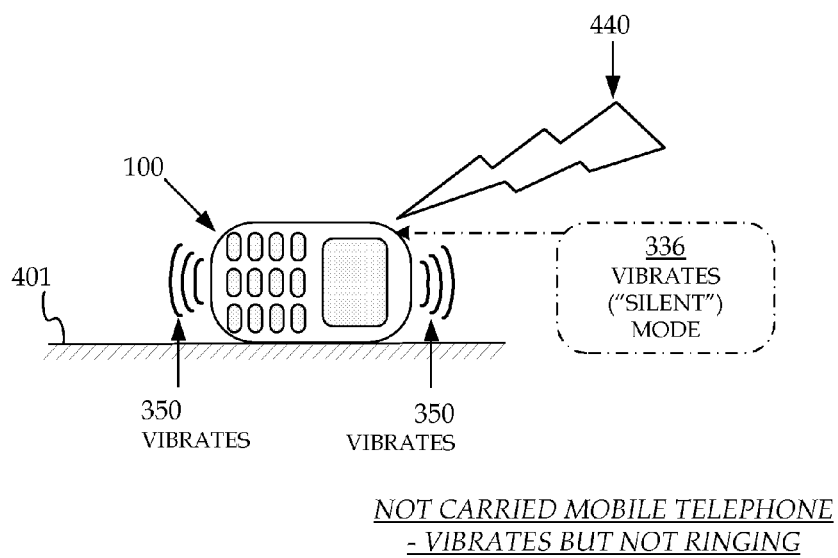
FIG. 4 is a diagram of the mobile telephone of FIG. 1, in the "Silent" annunciation mode of FIG. 3, while it is no longer carried, and receiving a telephone call and vibrating.
Figure 5:
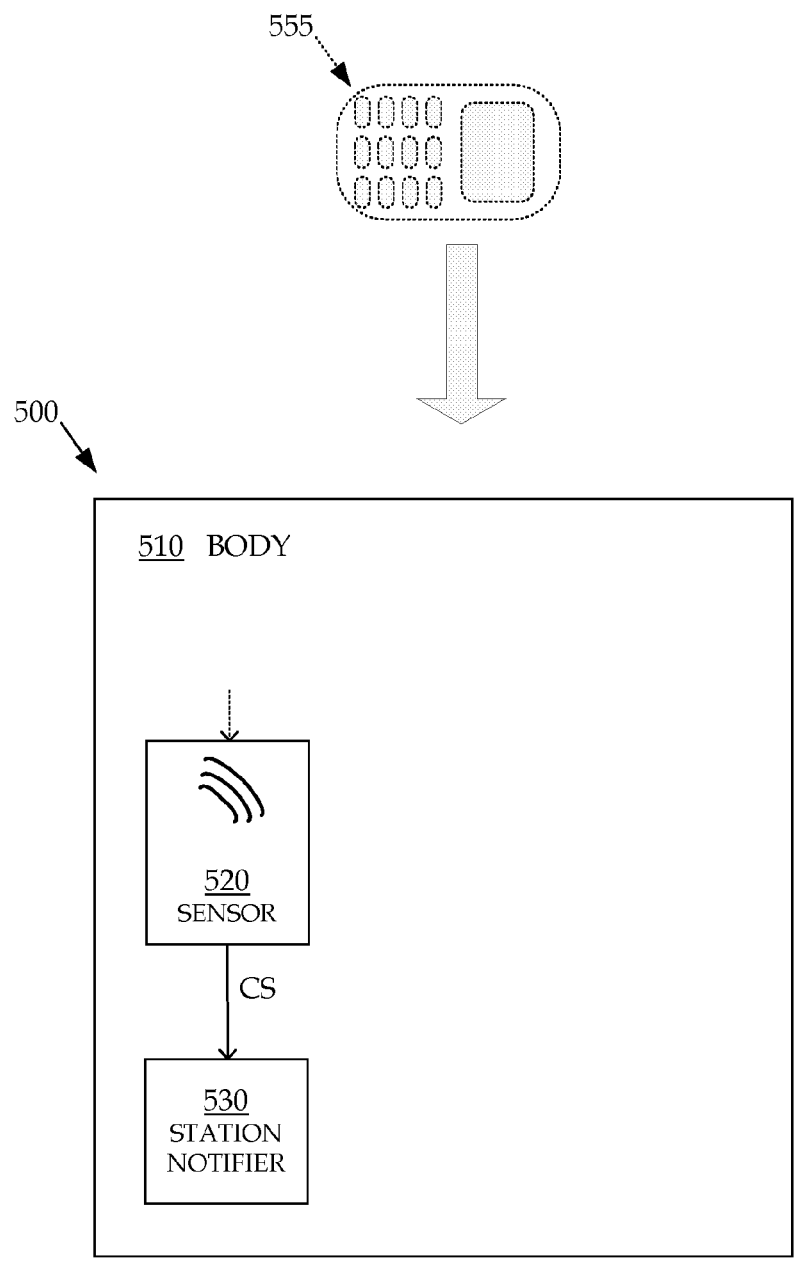
FIG. 5 is a block diagram of components of a station for supporting a Personal Electronic Device (PED) according to embodiments of the invention.

Referring now to FIG. 5, a set of components is shown for a station 500 made according to embodiments. Station 500 is for a Portable Electronic Device (PED) 555, which can be as a mobile telephone, a Personal Digital Assistant, and so on. PED 555 itself does not form part of the invention.

PED 555 includes an antenna operable to receive a wireless signal, such as in conjunction with receiving a telephone call or a text message. The wireless signal is received from a remote transmitter, such as those used by telephone companies for mobile telephones. Those transmitters can be hundreds or a few thousands of feet away from PED 555. As such, PED 555 does not receive the wireless signal from station 500 itself, in other words, station 500 is not the base of a home telephone that is portable.

PED 555 also includes a PED mechanism to operate for notifying a user about the received wireless signal. The PED mechanism can include a vibration mechanism for causing a vibration, or a PED speaker for generating a ring tone, or both.

Station 500 includes a body 510 for supporting PED 555. Body 510 can be made in a number of ways, as will be seen later in this document.

Station 500 also includes a sensor 520. Sensor 520 is adapted to sense when the PED mechanism is operating while PED 555 is supported by body 510. In addition sensor 520 is adapted to output a call signal CS responsive to so sensing.

Sensor 520 may be made in any number of ways, especially with a view to better and more reliably sensing the operation of the PED mechanism. In some embodiments, the PED mechanism includes a vibration mechanism for causing a mechanical vibration, and sensor 520 correspondingly includes a vibration sensor for perceiving the vibration.

The vibration sensor can be made as is known in the art. Vibration sensors are sensors for measuring, displaying and analyzing linear velocity, displacement and proximity, acceleration, etc. They can be used on a stand-alone basis, or in conjunction with a data acquisition system that can be optionally included as a circuit in the station.

Vibration sensors are available in many forms. They can be raw sensing elements, packaged transducers, or as a sensor system or instrument, incorporating features such as totalizing and data recording. These devices work on many operating principles. The most common types of vibration sensors are piezoelectric, capacitance, null-balance, strain gage, resonance beam, piezoresistive and magnetic induction. An alternative to traditional vibration sensors is one manufactured using MEMS technology, a micro-machining technology that allows for a much smaller device and thus package design.

Vibration sensors can have from one axis to three axes of measurement, the multiple axes typically being orthogonal to each other. The design choice is best made in conjunction with the exact shape of station 500. For example, if station 500 is provided a cavity as described below, the cavity can define different directions vibration of PED 555. In such instances, there can be more than one sensors, one for each direction, with their output signals combined, and so on.

Five main features must be considered when selecting vibration sensors, and adjusted for best sensing the vibration of PED 555. The features are measuring range, frequency range, accuracy, transverse sensitivity and ambient conditions.

Measuring range can be in G's for acceleration, in/sec for linear velocity (or other distance over time), and inches or other distance for displacement and proximity.

Frequency is measured in Hz, and accuracy is typically represented as a percentage of allowable error over the full measurement range of the device.

Transverse sensitivity refers to the effect a force orthogonal to the one being measured can have on the reading, but that should not be a problem where station 500 is stationary, such at a home or office. Again, this is represented as percentage of full scale of allowable interference.

For the ambient conditions, such things as temperature should be considered, as well as the maximum shock and vibration the vibration sensors will be able to handle. This is the rating of how much abuse the device can stand before it stops performing, much different from how much vibration or acceleration vibration sensors can measure.

There are a number of electrical output options for the call signal. These can depend on the system being used with the vibration sensors. Common analog options are voltage, current or frequency. Digital output choices are the standard parallel and serial signals. Another option is to use vibration sensors with an output of a change in state of switches or alarms. In addition, these sensors can have acceleration, velocity, or displacement as output by either integrating or differentiating their primary output.

A great number of vendors for vibration sensors can be found in the World Wide Web. For example, one can search using a search engine such as google.com for "vibration sensor". At the time this document was originally filed with the U.S.P.T.O., vendors have websites at www.signalquest.com, www.sensorland.com, and www.wilcoxon.com.

In some embodiments, the PED mechanism includes a PED speaker for generating a ring tone, and sensor 520 correspondingly includes a microphone for perceiving the ring tone. In other embodiments, sensor 520 includes a vibration sensor along with the microphone.

Sensor 520 can be provided separately from body 510. In the preferred embodiment, however, sensor 520 is incorporated within body 510. It can be incorporated as a separate device, or as part of a circuit that is described later in this document.

Station 500 also includes a station notifier 530. Station notifier 530 can be made so that it generates a human-perceptible indication, responsive to call signal CS. As will be seen in more detail later in this document, in some embodiments station notifier 530 can include a station speaker, in which case the human-perceptible further indication includes a call sound. In other embodiments, station notifier 530 can include a station light, in which case the human-perceptible indication includes a light signal. Moreover, notifier 530 can include a combination of two or more of these and other items, and so on.

Station notifier 530 can be provided separately from body 510. In the preferred embodiments, however, a station speaker is incorporated within body 510, while a station light is provided at a surface of body 510.

As has already been mentioned, body 510 can be made in any number of ways and configurations. Materials include, by way of example and not of limitation, plastics and metal, and in general materials similar to those for making home telephones. Two main configurations are now described.

Figure 6:
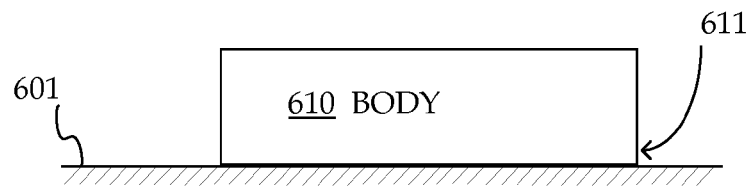
FIG. 6 is a diagram of a station according to embodiments that have a body with an underside suitable for being supported on a horizontal surface.

Referring to FIG. 6, a body 610 of a station according to an embodiment includes an underside 611 that has a substantially flat portion. As such, body 610 can be supported on a horizontal surface 601, which can be a kitchen counter, a night stand, a table top, or any surface someone might place a home telephone on. In the embodiment of FIG. 6, the entire underside 611 is flat, but that is not necessary.

In some embodiments, not shown in FIG. 6, underside 611 also includes feet, which can be made from rubber, plastic or other suitable material. The feet prevent body 610 from sliding on, or scratching surface 601.

Figure 7:
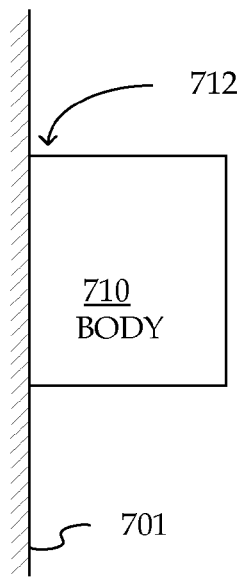
FIG. 7 is a diagram of a station according to embodiments that have a body adapted to be hung on a wall.

Referring to FIG. 7, a body 710 of a station according to an embodiment includes a feature 712 for hanging base 710 on a wall 701. Feature 712 can be made in any number of ways, some learned from how home telephone devices are made. For example, feature 712 can be a hole for nailing a nail therethrough, or for anchoring body 710 at the head of a screw.

Referring back to FIG. 5, and as mentioned above, body 510 can be made in any number of ways, for supporting PED 555. A number of such ways are now described.

In a number of embodiments, body 510 can include a surface, such as at the top, on which PED 555 can be deposited. The surface should be made such that it muffles as little as possible any vibration from PED 555, or ring tones from it. For example, the surface can be a rubber surface for supporting thereon PED 555, and further preventing it from displacing itself as it vibrates.

The surface can even have a drawing or instruction, explicit or implicit, for suggesting leaving PED 555 there. In some embodiments the surface is flat. Another embodiment is now described.

Figure 8:
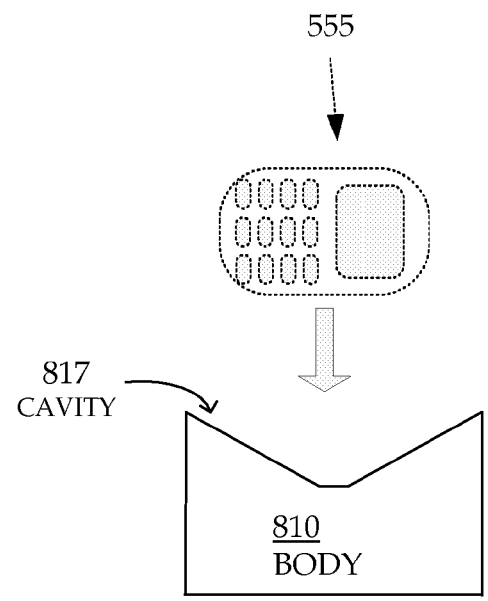
FIG. 8 is a diagram of a station according to embodiments where the body has a cavity for supporting a PED.

Referring to FIG. 8, a body 810 of a station according to an embodiment includes a cavity 817 for supporting therein PED 555. Cavity 817 can be trough shaped, hole shaped, and so on. In some embodiments, cavity 817 also includes a rubber surface for supporting thereon PED 555.

Cavity 817 provides for more predictability of where PED 555 will end up with respect to body 810, and thus also with respect to providing for sensor 520 (not shown in FIG. 8). The predictability will be because a first time user is more likely to understand where exactly PED 555 is to be placed, plus PED 555 will tend to gravitate towards the bottom of cavity 817. If the cavity is not provided with a rubber surface, PED 555 may even slide towards the bottom of cavity 817. In addition, if PED 555 is in cavity 817, it will make better, stronger contact with it, and therefore its vibration will be captured better for the sensor inside. Plus it will be displaced less as it vibrates.

In some embodiments, the body of a station has at least two mechanical components. One such component is a base, intended for supporting the body in its environment. For example, what was written above for the body being supported on a surface or a wall applies equally well to the base.

The other component is a receptacle, which is adapted for supporting the PED. For example, what was written above for the body supporting the PED applies equally well to the receptacle. For instance, it can have a top surface that is flat or includes a cavity. Or any other shape suitable for receiving PED 555.

In these embodiments, the sensor can sense a vibration between the base and the receptacle. The sensor can be ensconced in either the base or the receptacle, and operate based on the fact that the PED nested in the receptacle will cause the whole receptacle to vibrate with respect to the base.

The base and the receptacle can be provided in a number of configurations. Two sample such configurations are illustrated.

Referring to FIG. 9, a body 910 has a base 914, and a receptacle 916 that is above base 914. Base 914 is supported on horizontal surface 901. Receptacle 916 is adapted to receive and support PED 555 as per the above. In the example of FIG. 9, receptacle 916 does not includes a cavity, but that is only by example, not limitation.

Referring to FIG. 10, a body 1010 has a base 1014, and a receptacle 1016 that is to the side of base 1014. Base 914 is supported on a wall 1001. Receptacle 1016 is adapted to receive and support PED 555 as per the above. In the example of FIG. 10, receptacle 1016 also includes an optional cavity 1017.

Figure 11:
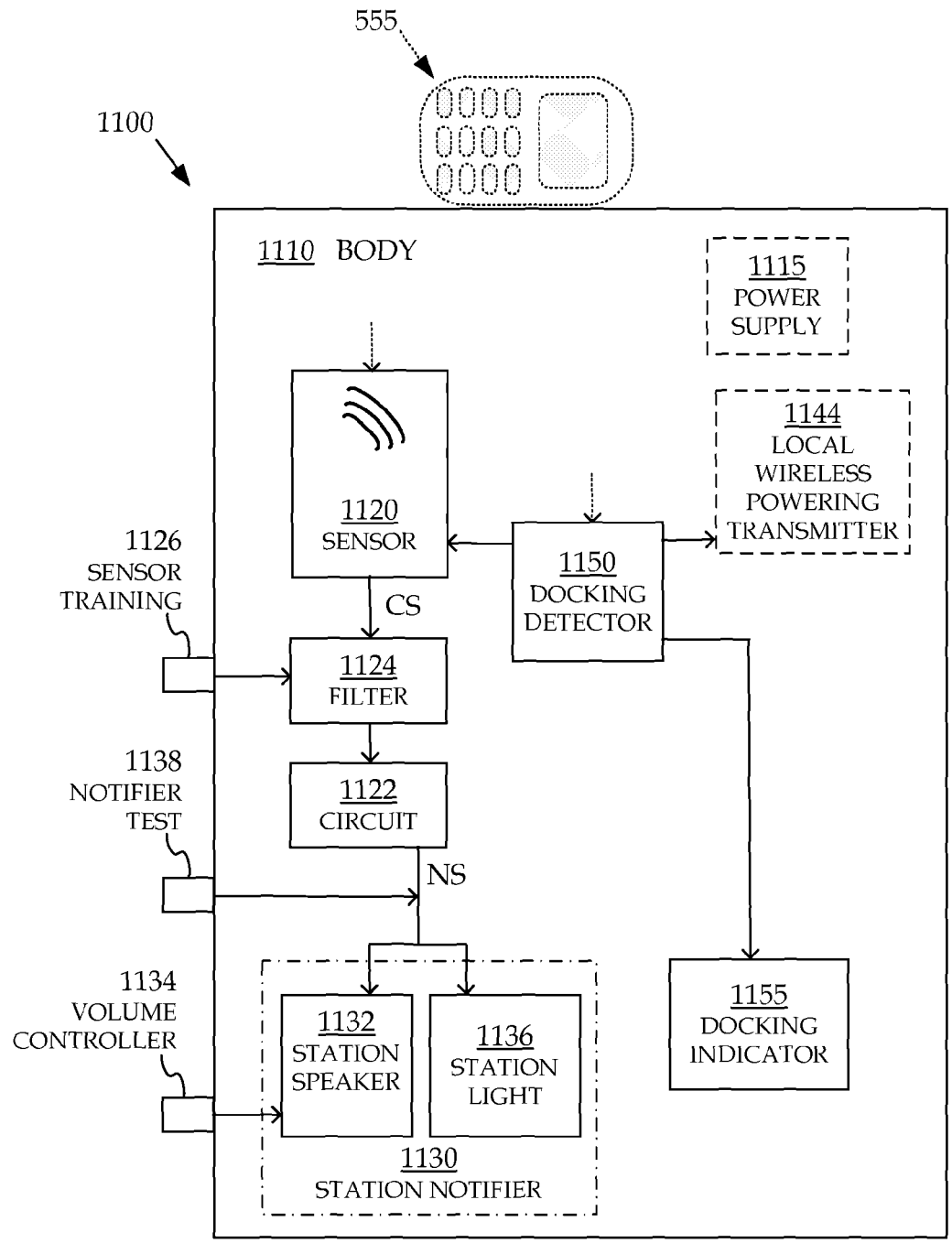
FIG. 11 is a block diagram of components of a station for supporting a PED according to optional embodiments of the invention.

FIG. 11 is a block diagram of components of a station 1100 for supporting PED 555 according to optional embodiments of the invention. Station 1100 includes a body 1110, which can be made as described above for such a body.

Station 1100 includes a sensor 1120, which can be as described for sensor 520, and adapted as necessary for the included optional components. Sensor 1120 generates call signal CS, when the PED mechanism of PED 555 is operating. In addition, station 1100 includes a station notifier 1130, which can be as described for station notifier 530. Notifier 1130 can output a human-perceptible indication responsive to call signal CS.

Station 1100 also optionally includes a power supply module 1115. Module 1115 supplies the electrical power needs of the components seen in FIG. 11, such as powering an operation of station notifier 1130, and so on. Module 1115 can be implemented within body 1110.

Power supply module 1115 can be implemented in any number of ways, as will be discerned by a person skilled in the art. For example, in some embodiments, module 1115 is a battery, while in others it is a transformer for converting electrical power, such as from a wall outlet to DC.

In some embodiments, station 1100 can also be a station for charging a battery of PED 555. In some embodiments, charging can be by wires, e.g. by combining it with an adapter. In some embodiments, charging can be wirelessly, for example as is performed by the products of Wildcharge, a company having a website at www.wildcharge.com, when this document is initially filed with the U.S. Patent Office. Wireless charging is performed by further adapting PED 555 with a chip that can harvest powering wireless signals, such as RF waves or magnetic waves. Products for charging PED 555 wirelessly include a local transmitter of such wireless signals. Such a local wireless powering transmitter 1144 can be provided close to station 1100, or within it, and can optionally and preferably be powered by module 1115.

Station 1100 optionally and preferably includes a circuit 1122. Circuit 1122 senses call signal CS, and in response generates a notifier signal NS for driving station notifier 1130.

Circuit 1122 can be made in any way known for circuits, such as with a printed circuit board (PCB), integrated circuit, Digital Signal Processing, and the like. In some embodiments, circuit 1122 includes or is provided jointly with others of the components shown in FIG. 11.

In some embodiments, station 1100 includes a filter 1124. Filter 1124 filters what sensor 1120 senses, and controls so that the human-perceptible indication is generated from station notifier 1130, but not generated when another event is sensed by sensor 1120. Other such events are thus filtered out, without causing station notifier 1130 to ring when it should not.

Filter 1124 may be implemented in a number of different ways. For example, it can be a mechanical filter. Or an electrical filter, formed as part of sensor 1120, circuit 1122, or both.

In addition, a sensor training actuator 1126 can be provided, which can be actuated when PED 555 is supported and vibrating. Actuator 1126 informs filter 1124, or circuit 1122, when a legitimate event is indeed taking place, for the device to be trained. For example, if filter 1124 is indeed used, it can adjust its pass bandwidth towards a frequency component with the largest amplitude. This way, other events will be excluded more reliably, and false notifications will be prevented. In operation, PED 555 can be supported by body 1110, and called. While ringing or vibrating, sensor training actuator 1126 can be actuated.

Station 1100 optionally also includes a station notifier testing actuator 1138. This can be an actuator for the user to test whether station notifier 1130 works. So, station notifier testing actuator 1138 can cause the human-perceptible indication to be generated when the PED mechanism is not sensed by sensor 1120 as operating. In some embodiments that is while PED 555 is supported by body 1110, or even if no PED is supported by body 1110. In the preferred embodiment, station notifier testing actuator operates by simulating or duplicating notifier signal NS.

Station notifier 1130 operates responsive to call signal CS, or its derivative notifier signal NS, when PED 555 is sensed as vibrating or ringing. Station notifier 1130 can be made in any number of ways.

In some embodiments, station notifier 1130 includes a station speaker 1132, which generates a call sound as its human-perceptible indication. The call sound can be akin to a ring tone for cell phones, be programmable, and so on. It is preferred that the human-perceptible indication be approximately as loud as that of a telephone, of a home or an office, since station 1100 is to support PED 555 at a home or office.

Station 1100 optionally also includes a volume controller 1134, for adjusting a volume of the call sound. Volume controller 1134 can be a knob that controls station speaker 1132. It is preferred to set this while operating station notifier testing actuator 1138.

Volume controller 1134 can have a setting all the way down to zero volume. In addition, or alternately, a disable switch can be provided for station speaker 1132. This way, office environments can be accommodated with no sound. In such embodiments, it is preferred that station notifier 1130 had another ways of notifying the user.

In some embodiments, station notifier 1130 includes a station light 1136, which generates a light signal as its human-perceptible indication. This is preferred for environments where ringing is not desired, such as offices. This is also preferably provided for stations that are for multiple PEDs, so that someone responding to a call can tell more quickly which of the PEDs rang.

In some embodiments, station notifier 1130 includes both a volume controller 1134, and a station light 1136. In addition, it can include a switch to decide which of them is to notify, and so on.

Station 1100 furthermore optionally includes a docking detector 1150. Docking detector 1150 can detect that PED 555 is indeed supported by body 1100. Docking detector 1150 can be implemented in any suitable way, such as with a pressure sensor, a switch that closes between a receptacle and a base, and so on.

An output of docking detector 1150 can control when station notifier 1130 generates the human-perceptible indication. Accordingly, in some embodiments, station notifier 1130 cannot generate the human-perceptible indication unless docking detector 1150 detects that PED 555 is supported by body 1110.

Station 1100 additionally optionally includes a docking indicator 1155. Docking indicator 1155 can be actuated when docking detector 1150 detects that PED 555 is supported by body 1100. Docking indicator 1155 can be a light, emitting light when actuated, or a speaker, emitting a sound when actuated. If a speaker, docking indicator 1155 can be implemented by station speaker 1132.

Docking indicator light 1155 is intended to provide comfort to the user, who will observe that station 1100 detects immediately that PED 555 has been placed there. This way, the user will have more trust that station 1100 works, and will rings or vibrate, when PED 555 receives a call.

In addition, if local wireless powering transmitter 1144 is indeed implemented, it can operate responsive to docking detector 1150 detects that PED 555 is supported by the body.

Operations of the invention are now described.

Figure 12:
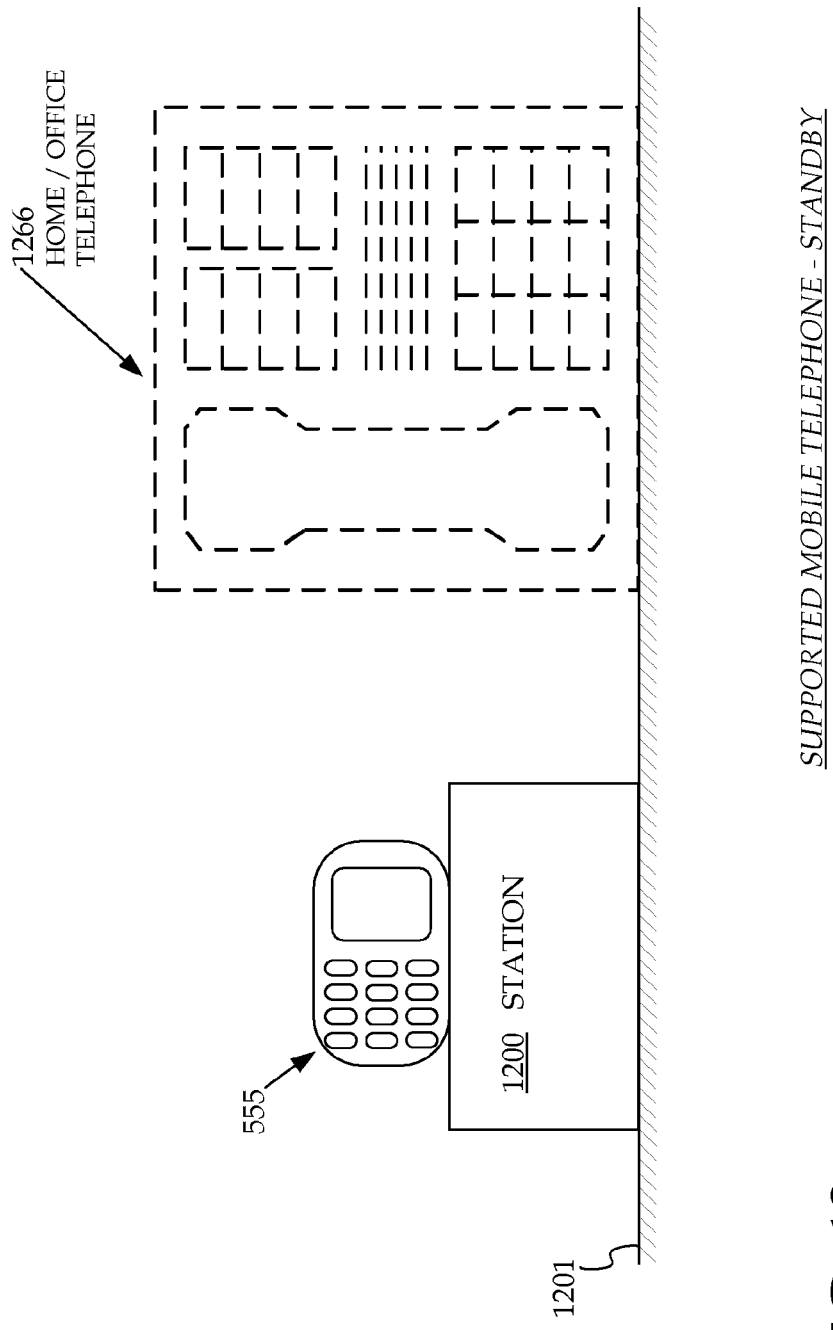
FIG. 12 is a diagram of a station with the components of the station of FIG. 5, further supporting a PED in standby mode, and next to an optional telephone of a home or office.

FIG. 12 is a diagram of a station 1200 according to embodiments. Station 1200 is provided close to an optional telephone 1266 of a home or office. Both station 1200 and telephone 1266 are supported on a surface 1201.

Station 1200 further supports PED 555, which is in standby mode. The operation of station 1200 is now examined in the event a wireless signal is received by supported PED 555.

Figure 13:
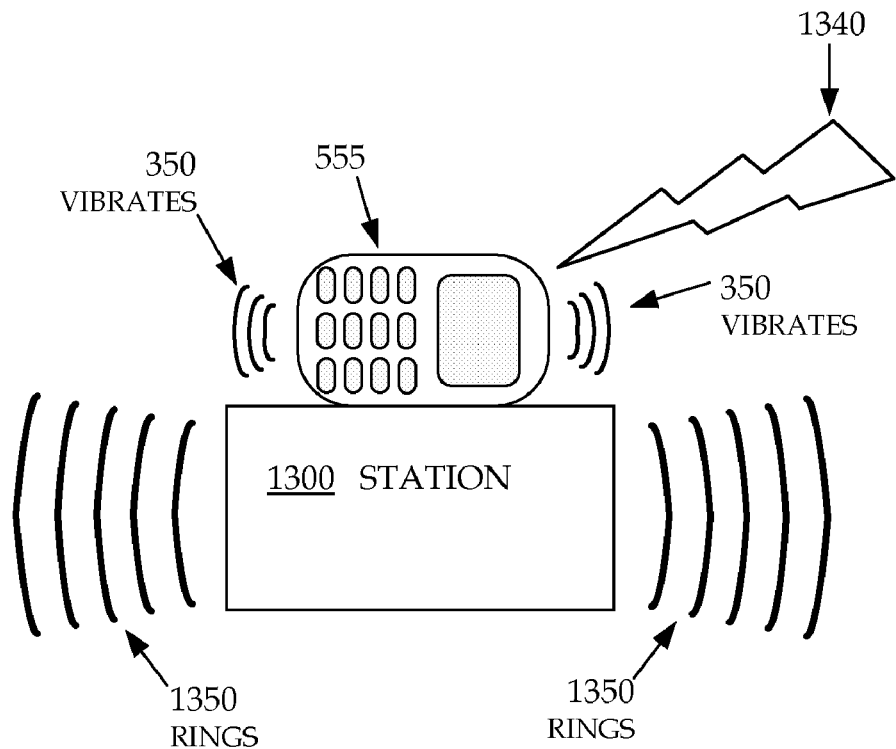
FIG. 13 is the diagram of an embodiment of the station of FIG. 12, except the supported PED is also receiving a wireless signal and vibrating because of it.

FIG. 13 is the diagram of a station 1300 according to an embodiment of station 1200 of FIG. 12, and in the same situation, except supported PED 555 is also receiving a wireless signal 1340, and vibrates 350 because of it. In the example of FIG. 13, station 1300 can sense the vibration 350 and therefore rings 1350, for example as if it were a home telephone.

Figure 14:
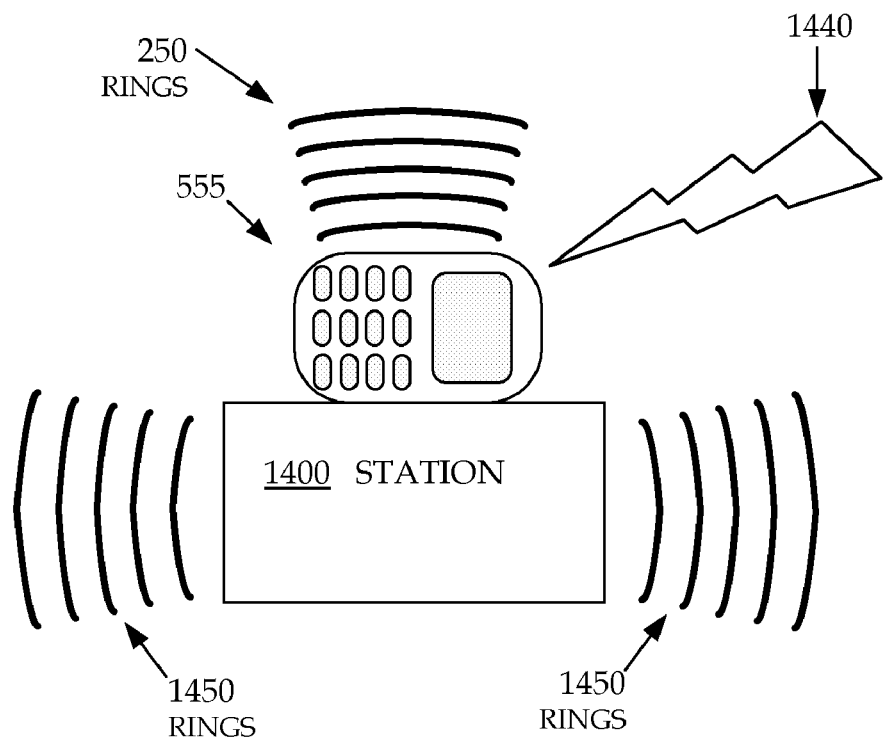
FIG. 14 is the diagram of an embodiment of the station of FIG. 12, except the supported PED is also receiving a wireless signal and ringing because of it.

FIG. 14 is the diagram of a station 1400 according to an embodiment of station 1200 of FIG. 12, and in the same situation, except supported PED 555 is also receiving a wireless signal 1440, and rings 250 because of it. In the example of FIG. 14, station 1400 can sense the ringing 250, and therefore again rings 1450, for example as if it were a home telephone.

Figure 15:
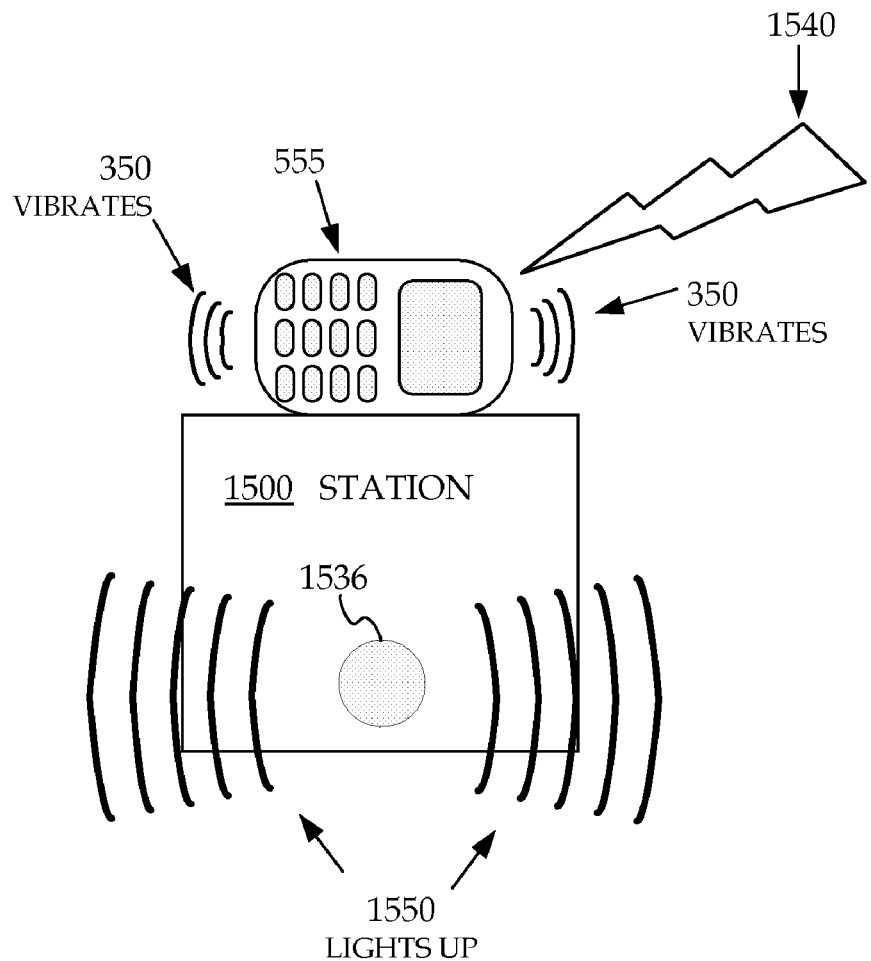
FIG. 15 is the diagram of an embodiment of the station of FIG. 12, except the supported PED is also receiving a wireless signal and vibrating because of it.

FIG. 15 is the diagram of a station 1500 according to an embodiment of station 1200 of FIG. 12, and in the same situation, except supported PED 555 is also receiving a wireless signal 1540, and vibrates 350 because of it. In the example of FIG. 15, the station notifier of station 1500 is a station light 1536. Station 1500 can sense the vibration 350, and therefore station light 1536 provides a light signal by lighting up 1550.

Figure 16:
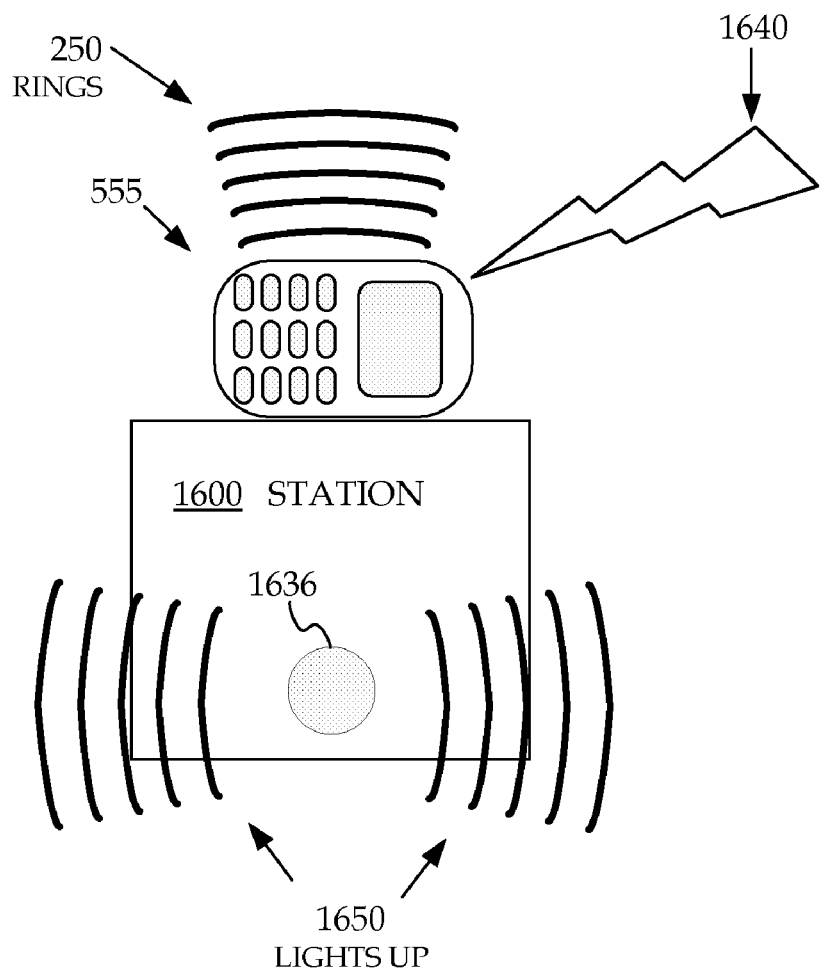
FIG. 16 is the diagram of an embodiment of the station of FIG. 12, except the supported PED is also receiving a wireless signal and ringing because of it.

FIG. 16 is the diagram of a station 1600 according to an embodiment of station 1200 of FIG. 12, and in the same situation, except supported PED 555 is also receiving a wireless signal 1640, and rings 250 because of it. In the example of FIG. 16, the station notifier of station 1600 is a station light

1636. Station 1600 can sense the ringing 250, and therefore station light 1636 provides a light signal by lighting up 1650.

Figure 17:
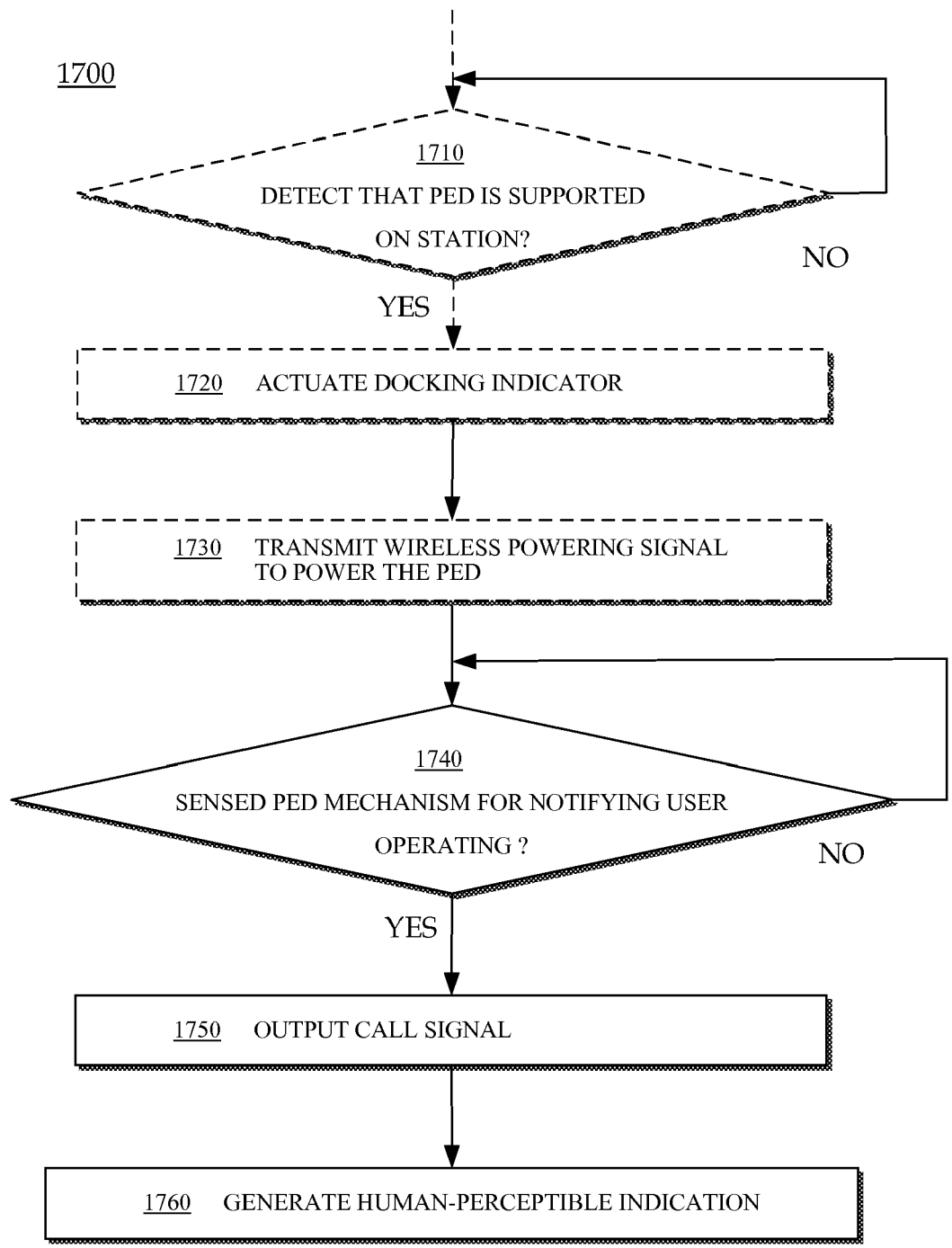
FIG. 17 is a flowchart illustrating methods according to embodiments.

FIG. 17 shows a flowchart 1700 for describing a method for a station. The method of flowchart 1700 may also be practiced by physical embodiments described above, e.g. station 500, station 1100, and so on.

According to an optional operation 1710, it is detected whether a PED is supported by the station. If not, the process repeats, until there is such detection. If or when there is such detection, according to an optional next operation 1720, a docking indicator is actuated in response to the detection. As mentioned also above, such a docking indicator can be audible or visible when actuated.

According to an optional operation 1730, a wireless powering signal is transmitted to power the PED. In the preferred embodiment, operation 1730 is performed only when operation 1710 detects that a PED is supported by the station, and responsive to it.

According to an operation 1740, it is sensed whether a Portable Electronic Device (PED) is operating a PED mechanism for notifying a user about a wireless signal that the PED is receiving. The wireless signal would be received from a transmitter at least 500 ft away from the station, and can be in conjunction with receiving a telephone call or a text message. If not, the process repeats, until there is such sensing.

Operation 1740 can be implemented in any number of ways. For example, sensing can include sensing a mechanical vibration of the PED mechanism, or sensing a ring tone emitted by the PED mechanism. In some embodiments, the station can include a base and a receptacle for supporting the PED, and sensing includes sensing a vibration between the base and the receptacle.

According to a next operation 1750, a call signal is outputted responsive to the sensing of operation 1740.

According to a next operation 1760, a human-perceptible indication is generated responsive to the call signal. The human-perceptible indication can be a call sound, a light signal, both, and so on. In some embodiments, the human-perceptible indication is generated only while the PED is detected as supported by the station, as per optional operation 1710.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A station for use with a Portable Electronic Device (PED) distinct from the station, the PED including an antenna operable to receive a wireless signal from a remote transmitter at least 500 feet away from the PED, the PED further including a PED mechanism to operate for generating a human-perceptible first call signal to notify a user about the received wireless signal, the station comprising:
   a body for supporting the PED;
   a sensor;
   a circuit for outputting a notifier signal responsive to the sensor sensing the human-perceptible first call signal while the PED is supported by the body;
   a station notifier for generating a human-perceptible indication responsive to the notifier signal; and
   a station notifier testing actuator for causing the station notifier to generate the human-perceptible indication when the human-perceptible first call signal is not being generated.

2. The station of claim 1, in which
   the station notifier testing actuator simulates the notifier signal for causing the station notifier to generate the human-perceptible indication.

3. The station of claim 1, in which
   the station notifier testing actuator duplicates the notifier signal for causing the station notifier to generate the human-perceptible indication.

4. The station of claim 1, in which the PED mechanism includes a vibration mechanism for causing a mechanical vibration as the human-perceptible first call signal, and the sensor includes a vibration sensor for perceiving the mechanical vibration.

5. The station of claim 1, in which the PED mechanism includes a PED speaker for emitting a ring tone as the human-perceptible first call signal, and the sensor includes a microphone for perceiving the ring tone.

6. The station of claim 1, in which the body includes a cavity for supporting therein the PED, the cavity including a rubber surface for supporting thereon the PED.

7. The station of claim 1, in which the station notifier includes a speaker.

8. The station of claim 7, In which the human-perceptible indication is a call sound generated from the speaker, and further comprising a volume controller for adjusting a volume of the call sound.

9. The station of claim 1, further comprising:
   a filter for filtering what the sensor senses as the human-perceptible first call signal,
   in which the notifier signal is output responsive to the filtered first call signal but not responsive to any filtered first call signal.

10. The station of claim 9, in which the filter is mechanical.

11. The station of claim 9, in which the filter is electrical.

* * * * *